US009478986B2

(12) United States Patent
Takahashi et al.

(10) Patent No.: US 9,478,986 B2
(45) Date of Patent: Oct. 25, 2016

(54) LOAD LEVELING SYSTEM OF POWER SYSTEM

(75) Inventors: Hirotaka Takahashi, Hitachinaka (JP); Yasushi Tomita, Mito (JP); Takashi Oda, Tokyo (JP); Eri Isozaki, Chiba (JP); Tsukasa Onishi, Hitachinaka (JP); Kazuhiro Horikoshi, Sendai (JP); Katsuhiro Matsuda, Sendai (JP)

(73) Assignees: Hitachi, Ltd., Tokyo (JP); Tohoku Electric Power Co., Inc., Sendai-shi (JP)

( * ) Notice: Subject to any disclaimer, the term of this patent is extended or adjusted under 35 U.S.C. 154(b) by 612 days.

(21) Appl. No.: 13/588,080

(22) Filed: Aug. 17, 2012

(65) Prior Publication Data
US 2013/0054040 A1 Feb. 28, 2013

(30) Foreign Application Priority Data

Aug. 23, 2011 (JP) .................................. 2011-181231

(51) Int. Cl.
*H02J 3/14* (2006.01)
*H02J 3/00* (2006.01)

(52) U.S. Cl.
CPC ............ *H02J 3/14* (2013.01); *H02J 2003/003* (2013.01); *Y02B 70/3225* (2013.01); *Y04S 10/54* (2013.01); *Y04S 20/222* (2013.01)

(58) Field of Classification Search
None
See application file for complete search history.

(56) References Cited

U.S. PATENT DOCUMENTS

| | | | |
|---|---|---|---|
| 6,624,532 B1 * | 9/2003 | Davidow et al. | 307/39 |
| 7,873,441 B2 * | 1/2011 | Synesiou et al. | 700/286 |
| 2004/0218688 A1 * | 11/2004 | Santhoff et al. | 375/295 |
| 2010/0222934 A1 * | 9/2010 | Iino et al. | 700/291 |
| 2011/0035075 A1 | 2/2011 | Tomita et al. | |
| 2011/0060476 A1 * | 3/2011 | Iino et al. | 700/297 |
| 2011/0238232 A1 | 9/2011 | Tomita et al. | |
| 2011/0282505 A1 | 11/2011 | Tomita et al. | |

FOREIGN PATENT DOCUMENTS

| | | |
|---|---|---|
| JP | 2002-010532 A | 1/2002 |
| JP | 2002-078203 A | 3/2002 |
| JP | 2002-369383 A | 12/2002 |
| JP | 2004-120919 A | 4/2004 |

(Continued)

OTHER PUBLICATIONS

"Smart Energy Consumption and the Smart Grid" by Siemens Industry, Inc. (Siemens USA website).*
Japanese Office Action dated Oct. 1, 2013 (Two (2) pages).

*Primary Examiner* — Mohammad Ali
*Assistant Examiner* — Saad M Kabir
(74) *Attorney, Agent, or Firm* — Crowell & Moring LLP

(57) ABSTRACT

A load leveling system and a method for a power system are capable of attaining load leveling in a distribution substation unit. The load leveling system is for a power system with a controller having a major customer and lower transforming apparatus, and with a customer connected to the lower transforming apparatus via a low-voltage line. The system also has a communication unit between the customer and its own system, and control use time zones of devices within the customer, as well as an electric demand prediction unit, and a first load leveling processing unit. By employing such a system, it becomes possible to provide a load leveling system for a power system that is capable of realizing load leveling of both a distribution substation unit and a pole transformer unit.

4 Claims, 10 Drawing Sheets

(56) References Cited

FOREIGN PATENT DOCUMENTS

| JP | 2005-086972 A | 3/2005 |
|---|---|---|
| JP | 2007-334523 A | 12/2007 |
| JP | 2010-068704 A | 3/2010 |
| JP | 2010-166636 A | 7/2010 |
| JP | 2010-270997 A | 12/2010 |
| JP | 2011-36084 A | 2/2011 |
| JP | 2012-55078 A | 3/2012 |
| WO | WO 2011/121815 A1 | 10/2011 |
| WO | WO 2012/098729 A1 | 7/2012 |

* cited by examiner

FIG. 6

| CUSTOMER ID | LOWER TRANSFORMING APPARATUS ID | TIME ZONE | ELECTRIC DEMAND ADJUSTMENT ABILITY | | |
|---|---|---|---|---|---|
| | | | DEVICE 1 | DEVICE 2 | DEVICE 3 |
| 0001 | 0001 | 0-2 | 5 | 2 | 1 |
| 0002 | 0001 | 0-2 | 3 | 4 | 2 |
| 0003 | 0001 | 0-2 | 2 | 1 | 5 |
| 0004 | 0002 | 0-2 | 0 | 3 | 2 |
| .. | .. | .. | .. | .. | .. |

LOAD LEVELING SYSTEM OF POWER SYSTEM

INCORPORATION BY REFERENCE

The present application claims priority from Japanese application JP2011-181231 filed on Aug. 23, 2011, the content of which is hereby incorporated by reference into this application.

BACKGROUND OF THE INVENTION

The present invention relates to a system for leveling a load of a power system and realizing stabilization of a power system.

In the power system, when all-electric homes further increase by a conventional pace, a power distribution installation (a distribution substation transformer or a pole transformer) needs to be replaced by a large-sized type through an increase in a load. However, there arises a problem that since cost for that purpose is a large burden for an electric power supplier, equipment cost is suppressed.

As one of effective technologies for suppressing a load peak as usual, a demand side management technology is disclosed in JP-A-2007-334523. According to the above technology, in the power system, in the case where there is present a time zone at which a load concentration is anticipated in a future such as the next day, reduction in the amount of the energy use is requested from an electric power supplier to customers. To the customer which moves a time zone for the energy use to the other time zones according to the request, an incentive such as a reception of power rate discount is given in exchange for the above.

The technology is characterized by that a request content of the reduction in the energy use amount to be requested for customers is information in each device and each time zone. Specifically, the request content is that "when the operation time of tomorrow for a dishwasher is changed into 10 to 11 o'clock, the unit price of power is changed to * yen at cut-rate prices". When the request content is brought into shape as described above, the technology exerts an effect that a customer is easy to respond to a request and as a result a load concentration state of the power system can be peak-shifted with a high expected value.

SUMMARY OF THE INVENTION

Incidentally, to realize reduction in the facility cost, load leveling in collaboration with each position is necessary so as to reduce a load peak in each position of a distribution system. There is a problem that each position fails to work with each other for the load leveling in the technology disclosed in JP-A-2007-334523.

That is, supposing that a load is leveled at a pole transformer level by using a conventional technology, for example, multiple residences are connected to pole transformers in a residential area. Therefore, a daily load curve is generally converted to a "two-lump type" curve in which a load becomes large at time zones of morning and evening or later. Accordingly, when the load in pole transformers is leveled, the load of mountain portions of the two-lump type curve are shifted to time zones of late-evening or daytime.

Incidentally, a distribution substation supplies power to home units in a widely-separated area. In a distribution system, the distribution substation is connected not only to home units in a residential district but also to major customers such as large-scale stores and factories in a distribution system. A daily load curve of these major customers is generally converted to a "one-lump type" curve in which a load is low at late-evening and early morning and is high in the daytime.

Accordingly, when the load is shifted to the time zone in the daytime through the load leveling of the pole transformers in a residential area, it is accumulated to the top of the load in the daytime of the major customers in a commercial area and an industrial area. Therefore, the load peak is not necessarily reduced in the distribution substation.

To attain the above-described object, it is an object of the present invention to provide a load leveling system of a power system capable of realizing load leveling of both a distribution substation unit and a pole transformer unit.

To attain the above-described object, a load leveling system of a power system includes a function of being applied to the power system including a major customer and lower transforming apparatus connected to an upper transforming apparatus via a high-voltage line and a customer connected to the lower transforming apparatus via a low-voltage line, arranging a communication unit between the customer and its own system, and outputting change request information of an operation time of devices within the customer; a prediction function of predicting at least electric demands of the upper transforming apparatus and the lower transforming apparatus; and a function of outputting the change request information of the operation time of devices within the customer so as to reduce a maximum value of electric demands of both the upper transforming apparatus and the lower transforming apparatus.

The load leveling system of a power system according to claim 1, further includes an electric demand prediction unit configured to divide a future electric demand into an adjustable demand and a non-adjustable demand and calculate them in each time zone at least in the lower transforming apparatus and the upper transforming apparatus; a first load leveling processing unit configured to set an electric demand target within a maximum electric demand, dispersion-shift a demand larger than the electric demand target to other time zones, and distribute the demand larger than the electric demand target to the lower transforming apparatus with regard to the electric demand of the upper transforming apparatus from the electric demand prediction unit; a second load leveling processing unit configured to correct an electric demand of the lower transforming apparatus from the electric demand prediction unit with the electric demand distributed by the first load leveling processing unit, reduce a maximum electric demand after the correction by a predetermined amount to set a new target, and repeat a correction while confirming that the electric demand of the upper transforming apparatus in the time zone at the time of shifting the reduced demand to a minimum demand time zone is not larger than the electric demand target; and an output unit configured to distribute an electric demand in each time zone determined by the second load leveling processing unit to each device within the customer and control a use time zone of the devices within the customer through a communication unit.

The electric demand target is further set according to a maximum value of a non-adjustable demand.

A minimum demand time zone for shifting a reduced demand in the second load leveling processing unit is further set as a time zone except the time zone set as an electric demand target in the first load leveling processing unit.

Further, examples of the device within the customer include an electric hot-water supplier, an air-conditioning apparatus, and a storage battery.

Also in conditions that a load peak added to a distribution installation increases through the progress of all electricity, a load peak of the distribution installation in each place can be reduced, and therefore existing facilities can be used for long periods. As a result, an exchange cost of facilities can be reduced.

Other objects, features and advantages of the invention will become apparent from the following description of the embodiments of the invention taken in conjunction with the accompanying drawings.

BRIEF DESCRIPTION OF THE DRAWINGS

FIG. 6 illustrates one example of contents of an electric demand adjustment ability DB S215;

DESCRIPTION OF THE EMBODIMENTS

Embodiments of the present invention will be described below with reference to the drawings.

First Embodiment

Figure 1:
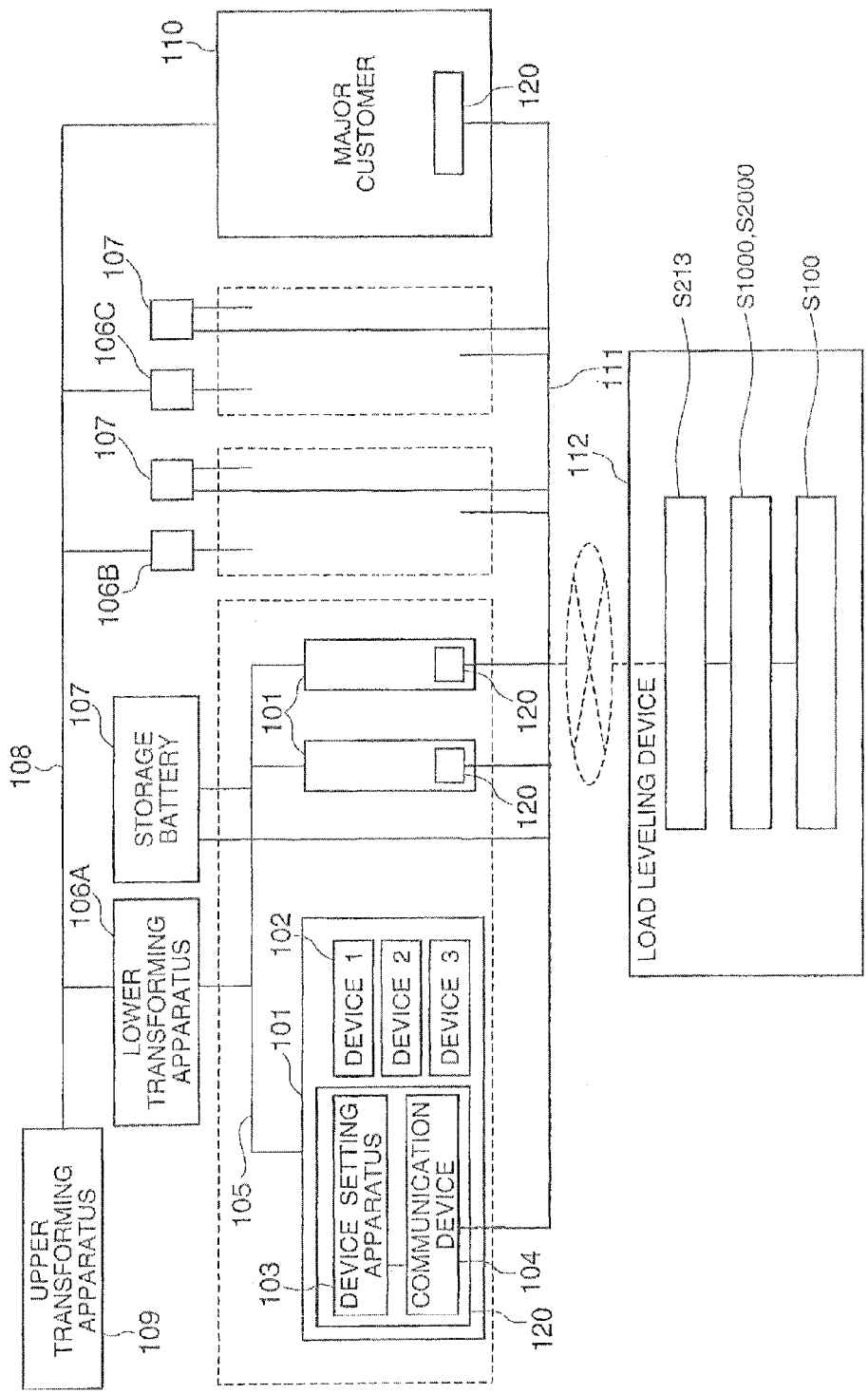
FIG. 1 illustrates a configuration example of a load leveling system of a power system.

FIG. 1 is a configuration diagram of a first embodiment of a load leveling system of a power system according to the present invention.

In this invention, a part of a power system side is described on a premise and this part is specifically constituted as follows. In FIG. 1, a reference numeral 109 denotes, for example, a distribution substation including a distribution transformer, and it supplies power to a customer 101 via a high-voltage transmission line 108, pole transformers 106A, 106B, 106C, and a low-voltage transmission line 105.

The distribution substation further supplies power directly to a major customer 110 from the high-voltage transmission line 108 without a pole transformer or a low-voltage transmission line. To the low-voltage transmission line 105, a storage battery 107 may be further connected.

In this configuration, when the distribution substation 109 including a distribution transformer is supposed to be an upper transforming apparatus, the pole transformer is a lower transforming apparatus. The low-voltage transmission line 105 is referred to as a low-voltage line, and the high-voltage transmission line 108 is referred to as a high-voltage line. In the illustration and description, a power system having a configuration in which three lower transforming apparatus 106A, 106B, 106C are arranged will be described as an example.

In the present embodiment, the customer 101, the major customer 110, and the storage battery 107 are connected to a load leveling device 112 via a communication line 111. Within the customer 101, the major customer 110, and the storage battery 107, a load control device 120 connected to the communication line 111 is provided. In the load control device 120, a communication device 104 and a device setting apparatus 103 are included.

In the customers 101, the load control devices 120 are illustrated. Here, the communication device 104 is connected to the load leveling device 112 via the communication line 111, receives information to be transmitted from the load leveling device 112, and supplies its contents to the device setting apparatus 103. The device setting apparatus 103 has a function of remotely setting devices 102 according to information to be produced from the load leveling device 112 and notifying inhabitants of setting contents of the devices 102. The load control device 120 having the same function is included also in the major customer 110 and the storage battery 107. In the illustration and description, three devices 102 are supposed to be provided within the customer 101.

Through the above-described configuration, on and off of the devices 102 in the customer 101, the major customer 110, and the storage battery 107 can be directly controlled or indirectly controlled through a person according to a command from the load leveling device 112. As a result, a load of the lower transforming apparatus 106A, 106B, 106C or that of the upper transforming apparatus 109 can be adjusted for each time zone.

Further, the storage battery 107 also corresponds to these devices 102, and therefore is applicable as a control object from the load leveling device 112. The storage battery herein said includes a state management function and a charge and discharge control function, and can control a period and amount for the charge and discharge. The storage battery 107 is a storage battery installed on a charging device of an electric vehicle, and controls the charge and discharge amount via the power conversion device.

In the case of the present embodiment, when viewed from the side of the load leveling device 112, these devices 102 including the storage battery 107 can adjust a load amount according to the command, and are appropriately referred to as a load adjustable device. As far as there is no necessity in particular in the following description, the devices including the storage battery 107 are simply referred to as the device 102.

As described above, for example, the present embodiment has a configuration which is applied to the major customer 110 and lower transforming apparatus 106A, 106B, 106C connected to the upper transforming apparatus 109 via the high-voltage transmission line 108 and a power system including the customer 101 connected to the lower transforming apparatus 106A, 106B, 106C via the low-voltage transmission line 105, and which has a function of arranging the communication line 111 between the customers 101 and the load leveling device 112, and outputting change request information on an operation time of the devices within the customer.

In terms of software, the present embodiment is further realized as the load leveling device 112 by using a computer. Specifically, the load leveling device 112 of FIG. 1 has a prediction function (S100) of predicting at least an electric demand of the upper transforming apparatus 109 and the lower transforming apparatus 106A, 106B. 106C, an operational function (S1000, S2000) of calculating the change request information of an operation time of the devices within the customer so as to reduce a maximum value of the electric demands of both the upper transforming apparatus 109 and the lower transforming apparatus 106A, 106B, 106C, and a function (S213, S214) of outputting the change request information of the calculated operation time.

As can be seen from the above sequence, for reducing load peaks of both the upper transforming apparatus 109 and the lower transforming apparatus 106A, 106B, 106C, the load leveling device 112 transmits device setting contents for each time zone and acquires result information on the electric demands of the customer 101, the storage battery 107, and the major customer 110.

Detailed configuration and operations of the above functions of the load leveling device 112 will be described in the load leveling system of the power system according to a second embodiment. Subsequently, the load leveling device 112 will be further described in detail below.

Second Embodiment

Figure 2:
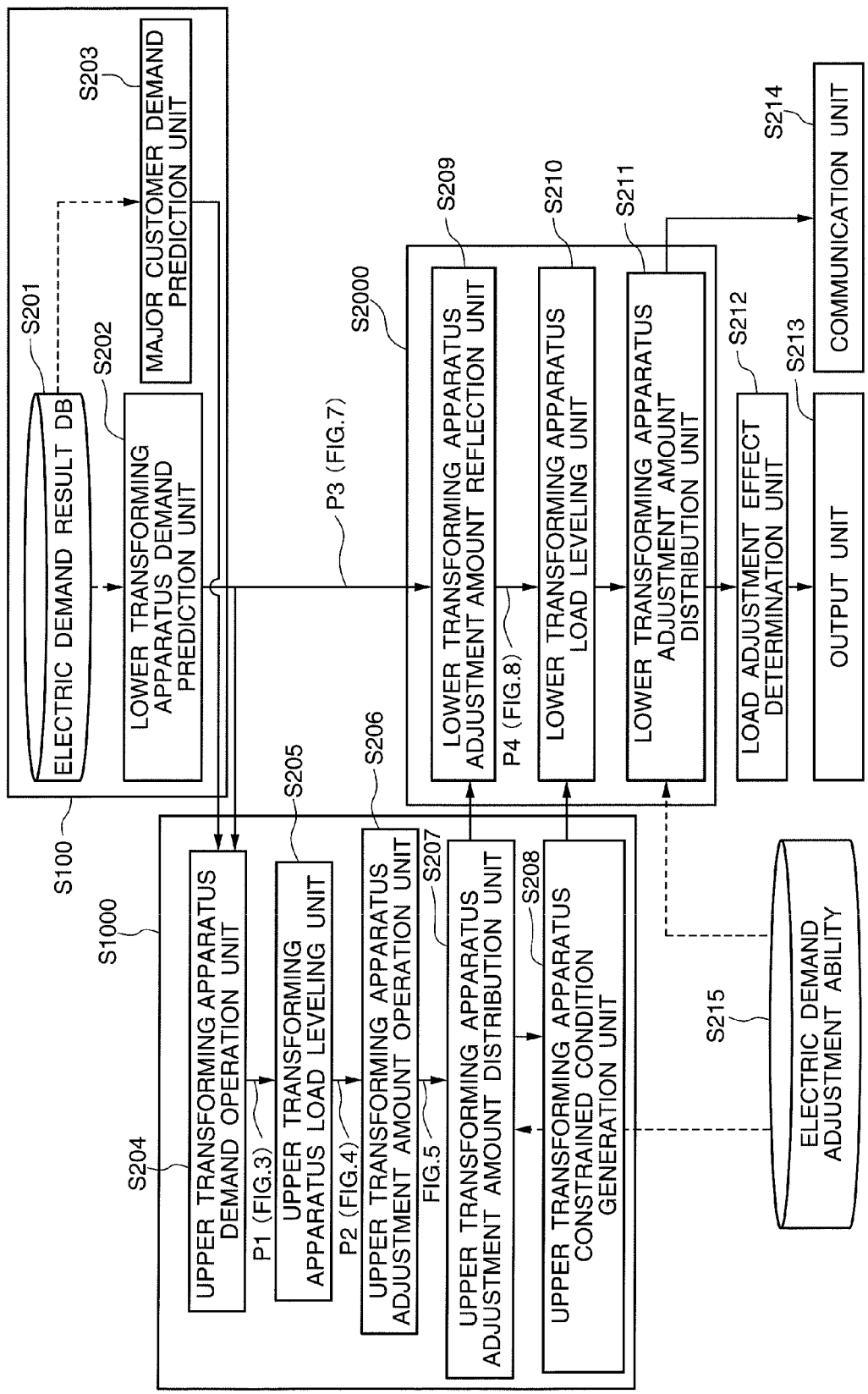
FIG. 2 is a functional block diagram illustrating a load leveling device.

FIG. 2 is a configuration diagram example illustrating a load leveling system of a power system according to another embodiment of the present invention. In the present embodiment, a configuration of a characteristic portion of the first embodiment will be described in detail. In short, the load leveling device 112 will be further described in detail.

According to the present embodiment, in FIG. 2 illustrating the second embodiment, "an electric demand prediction unit which divides a future electric demand into an adjustable demand and non-adjustable demand and calculates them for each time zone at least with regard to the lower transforming apparatus and the upper transforming apparatus" corresponds to S100 configured by the electric demand result database (hereafter, simply referred to as a DB) S201 and the demand prediction processing units S202 and S203 which perform the demand prediction of the lower transforming apparatus 106A, 106B, 106C and the major customer 110.

In the load leveling device 112 illustrated in a functional block diagram of its own device of FIG. 2, a DB for storing two types of data necessary for performing the process is prepared.

A first DB is the electric demand result DB S201, and result information on the electric demands of the customer 101 (including the storage battery) and the major customer 110 is stored in the first DB. The electric demand information is supposed to be stored in a status identifiable to the electric demand of a device (e.g., an electric hot-water supplier as a contract object) capable of time-shifting and the electric demand of a device (a power device other than a contract object). For each time zone of one day, this result data is stored with information such as weather, temperature, season, and day of the week of the current day.

The demand prediction processing units S202 and S203 perform the demand prediction of the lower transforming apparatus 106A, 106B, 106C and the major customer 110, respectively, by using data of this electric demand result DB S201. Accordingly, a total of the above demand prediction becomes equal to the demand prediction in the upper transforming apparatus (e.g., a distribution substation unit). Note that since the demand prediction of the lower transforming apparatus 106A, 106B, 106C is performed in a unit of the lower transforming apparatus 106A, 106B, 106C, three groups of the demand prediction of the lower transforming apparatus 106A, 106B, 106C are calculated in the example of FIG. 1.

In the above demand prediction, the lower transforming apparatus demand prediction unit S202 predicts the electric demand of the lower transforming apparatus 106A, 106B, 106C based on the result information of the electric demand in each customer 101 recorded in the electric demand result DB S201. The major customer demand prediction unit S203 predicts the electric demand of the major customer based on the result information of the electric demand of the major customer 110 recorded in the electric demand result DB S201. In these predictions, past data of a day of conditions nearest to those of the prediction day is selected based on the past data recorded in the electric demand result DB S201. Specific conditions are further added to the prediction day and the electric demand is determined for each time zone.

In the present embodiment, "with regard to the electric demand of the upper transforming apparatus from the electric demand prediction unit, a function of a first load leveling processing unit which sets an electric demand target smaller than or equal to the maximum electric demand, dispersion-shifts a demand larger than the electric demand target to other time zones, and distributes the demand larger than the electric demand target to the lower transforming apparatus" corresponds to a partial function of the "operational function (S1000, S2000) of calculating change request information of the operation time of the devices within the customer so as to reduce a maximum value of the electric demands of both the upper transforming apparatus 109 and the lower transforming apparatus 106A, 106B, 106C" of the first embodiment.

That is, the first load leveling processing unit represents a portion (S1000) in which the upper transforming apparatus performs the electric demand prediction in the operational function (S1000, S2000). In the present embodiment, "a second load leveling processing unit which corrects the electric demand of the lower transforming apparatus from the electric demand prediction unit by the electric demand distributed by the first load leveling processing unit, sets a new target while reducing the corrected maximum electric demand by a predetermined amount, and repeats correction while confirming that the electric demand of the upper transforming apparatus of the time zone at the time of shifting a reduced demand to a minimum demand time zone is not larger than the electric demand target" represents a portion (S2000) in which the lower transforming apparatus performs the electric demand prediction.

In the subsequent processes of the second embodiment illustrated in FIG. 2, the operation units (S1000, S2000) perform a process based on the above prediction values. In this order, the operation units first perform a process (the upper side process S1000) of the upper transforming apparatus side on a priority base in processing units S204 to S208, then receive this result, and perform a process (the lower side process S2000) of the lower transforming apparatus side in processing units S209 to S211.

In the upper side process S1000, the electric demand of the upper transforming apparatus 109 is obtained by totalizing the electric demand of the lower transforming apparatus 106A, 106B, 106C and the electric demand of the major customer 110. Accordingly, the upper transforming apparatus demand operation unit S204 first totalizes a demand prediction result of the lower transforming apparatus demand prediction unit S202 and a demand prediction result of the major customer demand prediction unit S203.

Figure 3:
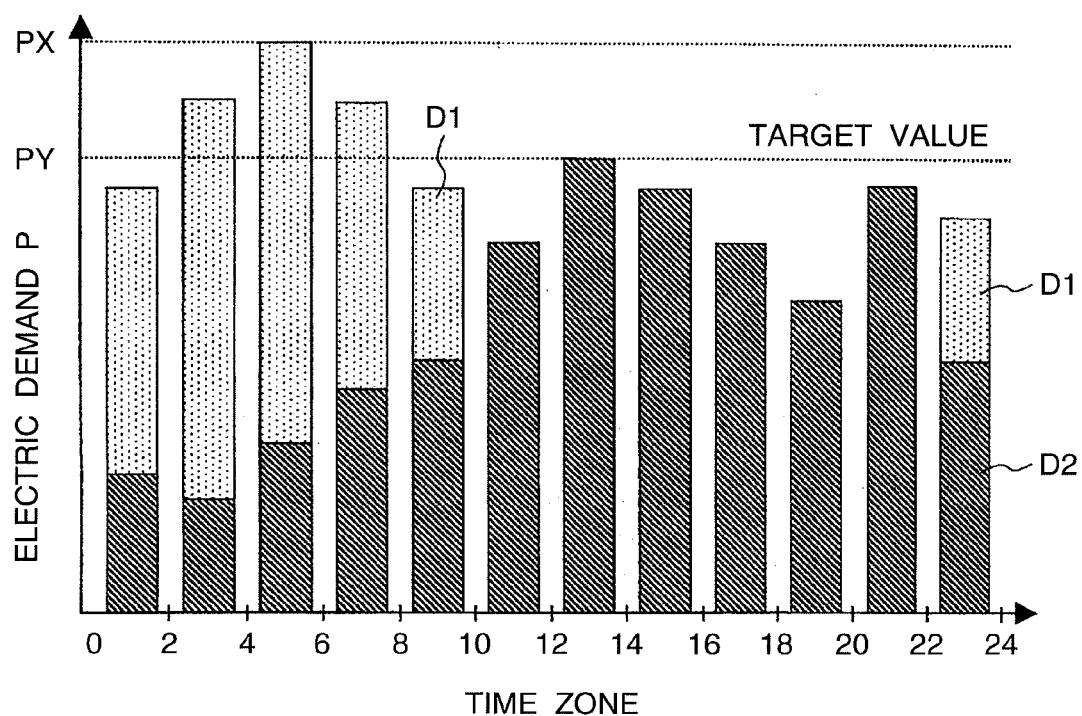
FIG. 3 illustrates a particular case of a total prediction result pattern P1 (before load leveling of an upper transforming apparatus 109) through an upper transforming apparatus demand operation unit S204.

FIG. 3 illustrates a particular case of a total prediction result pattern P1 through this upper transforming apparatus demand operation unit S204. This pattern indicates a demand prediction value before the load leveling of the upper transforming apparatus 109. The prediction value is calculated in a unit of an hour over 24 hours of one day, and a prediction value in an interval of two hours in the illustrated example.

In the demand prediction of the distribution substation as this upper transforming apparatus 109, for example, there is generated variation in which a first peak of the demand appears between 4 to 6 o'clock in the early morning, the demand is reduced once in the morning, a second peak is present at noon, and a third peak comes after 8 o'clock at night. Suppose that in this demand pattern P1, a D1 portion indicates a demand (load adjustable demand) through the load adjustable device 102, and a D2 portion indicates a demand (load non-adjustable demand) except the above demand. Namely, the D1 portion indicates a time shiftable demand, and the D2 portion indicates a time non-shiftable demand.

Figure 4:
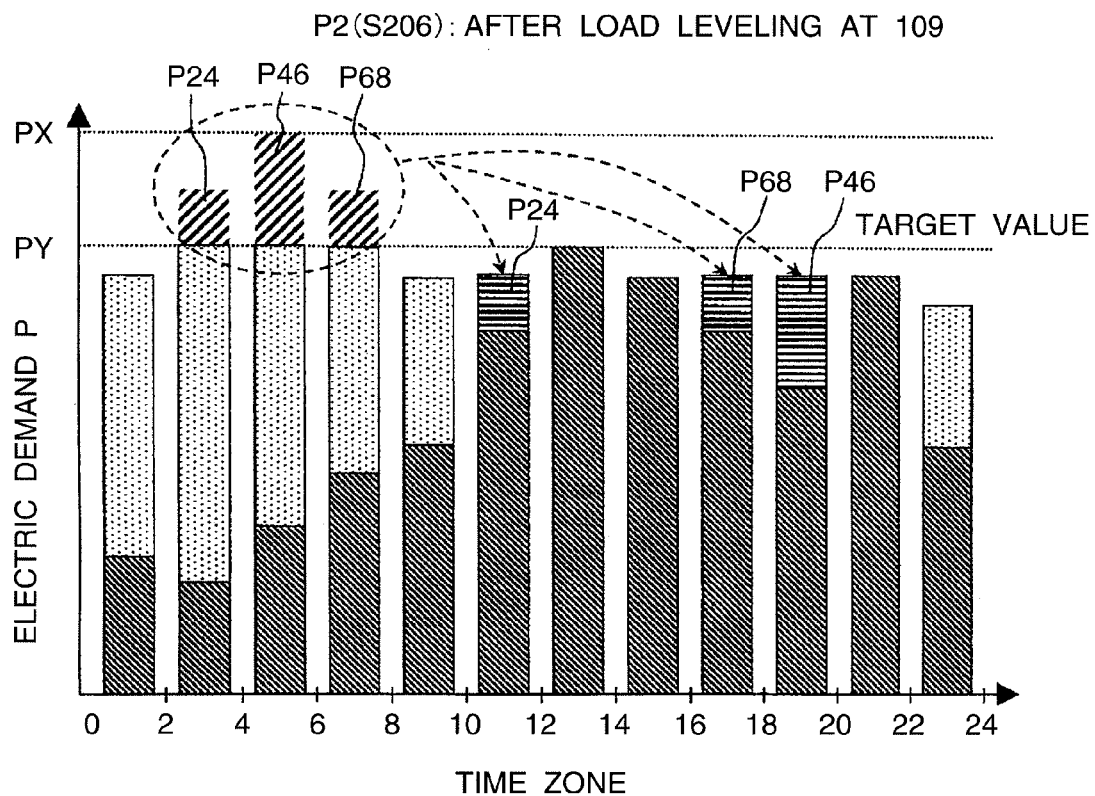
FIG. 4 illustrates an electric demand pattern P2 after a load leveling process through an upper transforming apparatus load leveling unit S205.

In the load leveling device 112 of FIG. 1, a demand prediction result of the above upper transforming apparatus 109 is taken into consideration, and the following process is performed so as to level the result. For a processing result through the load leveling device 112, it is finally expected that the leveling is performed as in FIG. 4. In FIG. 4, a demand portion in an early morning in which the electric demand is larger than a target value PY is shifted to a demand portion in the daytime, and the demand of one day is desired to be leveled.

To obtain the final result, the upper transforming apparatus load leveling unit S205 first levels the load with regard to operation results of the upper transforming apparatus demand operation unit S204. The processing method will be described with reference to FIGS. 3 and 4. FIG. 3 illustrates one example of the electric demand before the load leveling of the upper transforming apparatus 109. Suppose that a maximum value of the electric demand (sum of the time shiftable demand and the time non-shiftable demand) is set as PX, and a maximum value of only the time non-shiftable load is set as PY. Here, the target value of the load leveling is set as the maximum value (namely, PY) of the time non-shiftable electric demand. At this time, a portion larger than the target value PY is to be shifted in the time shiftable load. FIG. 4 is a diagram after the load leveling of the upper transforming apparatus 109, and a portion surrounded by a dotted line is the electric demand to be shifted.

The upper transforming apparatus load leveling unit S205 sets values of PX and PY according to the above-described idea and outputs a demand pattern of FIG. 4 as a desired pattern. In a subsequent process, the upper transforming apparatus load leveling unit S205 performs the time shift using as a target an idea of FIG. 4; however, since the time shift may not necessarily be performed as in the target, this is a desirable value adamantly.

As a method for leveling the load, a process of 'shifting a part of the electric demand to be shifted to a smallest time zone of the electric demand (total of the time shiftable demand and the time non-shiftable demand) of that time point' is supposed to be repeated until the entire electric demand to be shifted is shifted to other time zones. As a result, when the load leveling is performed as requested, it is performed as in the electric demand after the load leveling of the upper transforming apparatus 109 as illustrated in FIG. 4 and the maximum value of the electric demand is reduced from PX to PY.

As a result of the process of the upper transforming apparatus load leveling unit S205, the electric demand before the load leveling of FIG. 3 and the electric demand after the load leveling of FIG. 4 are calculated and the calculated electric demands are transmitted to the next process.

Referring to FIG. 2, an upper transforming apparatus adjustment mount operation unit S206 calculates the adjustment amount of the electric demand for leveling the load of the upper transforming apparatus 109. An operation formula is a formula (1).

$$\text{Adjustment amount of electric demand of each time zone} = \text{electric demand before load leveling} - \text{electric demand after load leveling} \quad \text{formula (1)}$$

Figure 5:
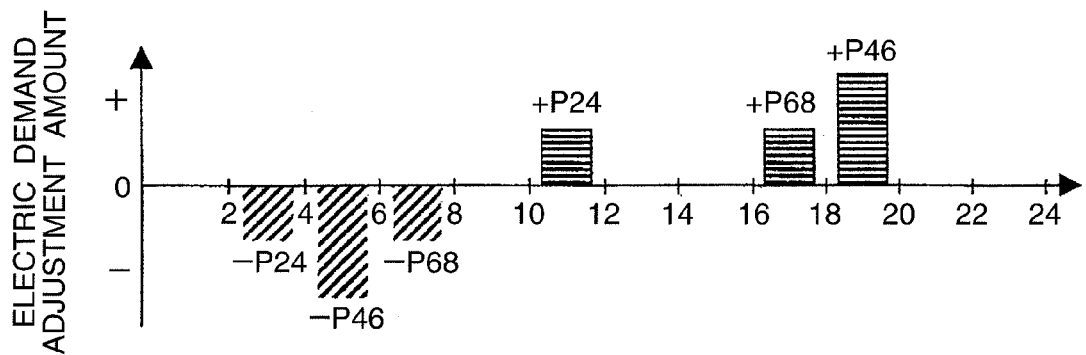
FIG. 5 illustrates an operation result of an upper transforming apparatus electric demand adjustment amount operation unit S206.

In FIG. 5, there is illustrated an operation result of the upper transforming apparatus electric demand adjustment mount operation unit S206. A graph of FIG. 5 is obtained by subtracting the electric demand (FIG. 4) after the load leveling from the electric demand (FIG. 3) before the load leveling. An area in which the electric demand adjustment amount of the vertical axis is positive means that the electric demand is increased, and on the other hand, an area in which the electric demand adjustment amount of the vertical axis is negative means that the electric demand is decreased. Specifically, the graph represents that a load P24 of 2 to 4 time zone is moved to a 10 to 12 time zone, a load P46 of 4 to 6 time zone is moved to a 18 to 20 time zone, and a load P68 of 6 to 8 time zone is moved to a 16 to 18 time zone.

Referring to FIG. 2, the upper transforming apparatus adjustment amount distribution unit S207 distributes the electric demand calculated by the upper transforming apparatus adjustment mount operation unit S206 to each lower transforming apparatus 106A, 106B, 106C. That is, in the example of FIG. 1, since the lower transforming apparatus is constituted by three lower transforming apparatus 106A, 106B, and 106C, the upper transforming apparatus adjustment amount distribution unit S207 distributes the adjustment amount of FIG. 5 so as to be borne by the three apparatus 106A, 106B, and 106C.

Here, as the premise of the following description of the present invention, the load leveling on the side of the major customer 110 is supposed to be already performed by a specific method of the major customer 110. Specifically, descriptions will be made assuming that the time shiftable demand D1 of FIG. 3 is the left time shiftable demand D1 on the side of the lower transforming apparatus 106A, 106B, 106C.

A distribution method of the calculated electric demand (FIG. 5) is performed through the distribution using a ratio of the electric demand adjustment ability of the customer 101 connected to the lower transforming apparatus 106A, 106B, 106C. Here, examples of the electric demand adjustment ability include the tank's remaining capacity in the case of an electric hot-water supplier. That is, the electric hot-water supplier with the tank's remaining capacity of 300

(L) has a large load amount at the time of shifting a time as compared with that having the tank's remaining capacity of 100 (L), and therefore has a large electric demand adjustment ability. The electric demand adjustment ability of the customer 101 is recorded in the electric demand adjustment ability DB S215 for each customer.

In FIG. 6, there is illustrated one example of contents of the electric demand adjustment ability DB S215. Here, an adjustment ability in each time zone and device is recorded for each lower transforming apparatus ID and customer ID. As one example, three types of devices are illustrated. A value of the electric demand adjustment ability in each device may be a real number or a ranked value to several stages. Here, a ranked value to several stages is indicated by using points.

In this example, to the lower transforming apparatus 106A, 106B, 106C with the ID of "0001", three customers 101 with the IDs "0001" to "0003" are supposed to be connected, and each customer is supposed to have three devices. Between 0 to 2 o'clock, the electric demand adjustment ability of three devices of the customer with the ID "0001" is, for example, 5, 2, and 1 (points). Hereinafter, in the same manner, the electric demand adjustment ability of three devices of the customer with the ID "0002" at the same time zone is 3, 4, and 2 (points), and the electric demand adjustment ability of three devices of the customer with the ID "0003" at the same time zone is 2, 1, and 5 (points).

Suppose here that the total of the electric demand adjustment ability of the lower transforming apparatus 106A, 106B, 106C with the ID "0001" is 25 (points). Suppose, in the same manner, that the totals of the electric demand adjustment ability of the other lower transforming apparatus 106A, 106B, 106C with the IDs "0002" and "0003" connected to the upper transforming apparatus 109 are 20 and 30 (points), respectively.

Here, for calculating the electric demand adjustment ability of the lower transforming apparatus 106A, 106B, 106C with the ID "0001", the electric demand adjustment ability DB S215 is filtered by the lower transforming apparatus with the ID "0001", and the adjustment ability of the devices 1, 2, and 3 is totalized and calculated. In the same manner, the electric demand adjustment ability of 20 and 30 is obtained with regard to the lower transforming apparatus with the IDs "0002" and "0003".

In the case where the electric demand adjustment ability of the upper transforming apparatus 109 of a certain time zone is 100 under the conditions, an allocation of the electric demand adjustment amount to the lower transforming apparatus is in sequence as follows:

the electric demand adjustment amount of the lower transforming apparatus with the ID "0001": $100 \times \{25/(25+20+30)\}$, the electric demand adjustment amount of the lower transforming apparatus with the ID "0002": $100 \times \{20/(25+20+30)\}$, and the electric demand adjustment amount of the lower transforming apparatus with the ID "0003": $100 \times \{30/(25+20+30)\}$.

Referring to FIG. 2, an upper transforming apparatus constrained condition generation unit S208 records a maximum value of the electric demand after the load leveling of the upper transforming apparatus 109. In the example of FIG. 4, the constrained condition is the "value PY".

The above-described processes S204 to S208 are the load leveling process S1000 on the side of the upper transforming apparatus 109, and correspond to the first load leveling processing unit according to the second embodiment.

As described above, in the second embodiment, "there functions the first load leveling processing unit which sets (S204) an electric demand target within the maximum electric demand, dispersion-shifts (S206) a demand larger than the electric demand target to other time zones, and distributes (S207) the demand larger than the electric demand target to the lower transforming apparatus with regard to the electric demand of the upper transforming apparatus 109 from the electric demand prediction unit (S100)".

Next, this operation result is received and the process is moved to the load leveling process S2000 on the side of the lower transforming apparatus 106A, 106B, 106C. In the second embodiment, this process corresponds to "the second load leveling processing unit which corrects the electric demand of the lower transforming apparatus from the electric demand prediction unit with the electric demand distributed by the first load leveling processing unit, sets a new target reducing the maximum electric demand after the correction by a predetermined amount, and repeats the correction while confirming that the electric demand of the upper transforming apparatus in the time zone at the time of shifting the reduced demand to the minimum demand time zone is not larger than the electric demand target".

In the load leveling process S2000 on the side of the lower transforming apparatus 106A, 106B, 106C, there are used an allocation of the electric demand adjustment amount in a unit of the lower transforming apparatus calculated by the upper transforming apparatus adjustment amount distribution unit S207, the constrained condition "value PY" from the upper transforming apparatus constrained condition generation unit S208, an output result from the lower transforming apparatus demand prediction unit S202, and data from the electric demand adjustment ability DB S215.

Figure 7:
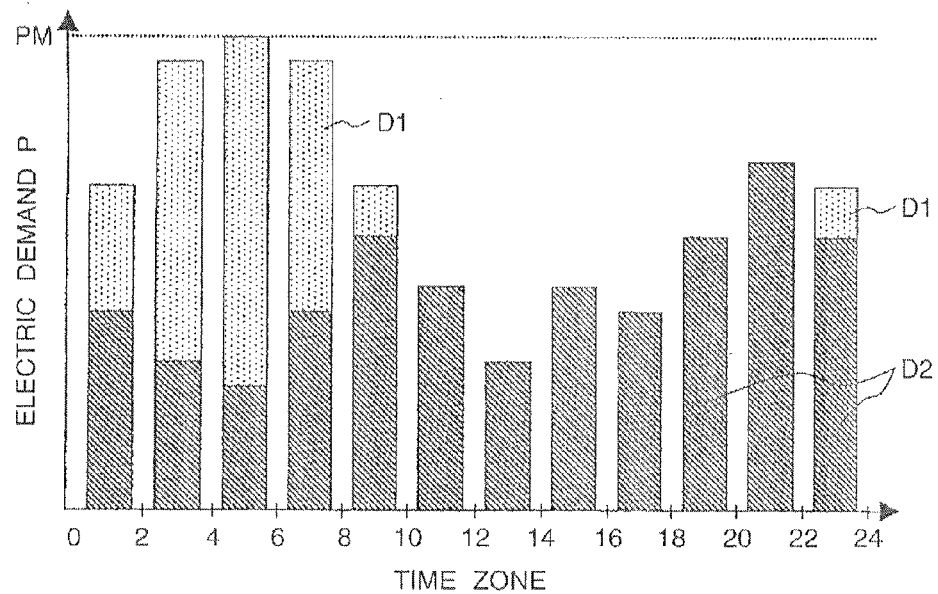
FIG. 7 illustrates output results of a lower transforming apparatus demand prediction unit S202.
Figure 8:
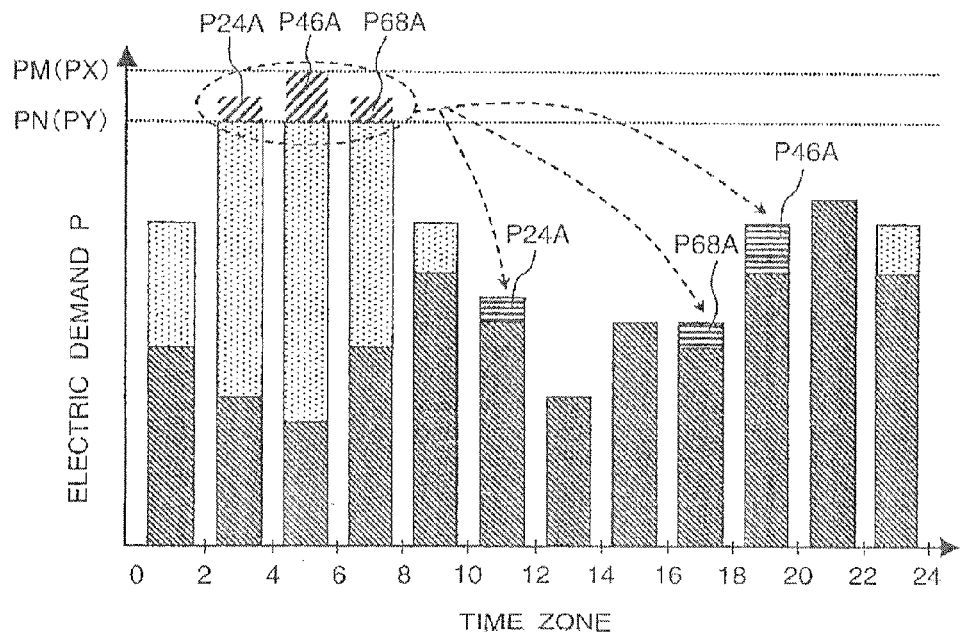
FIG. 8 illustrates an electric demand of the lower side after directly reflecting an electric demand adjustment amount determined by the side of an upper transforming apparatus 109.

The lower transforming apparatus adjustment amount reflection unit S209 first reflects the electric demand adjustment amount allocated by the upper transforming apparatus adjustment amount distribution unit S207 on the output result (FIG. 7) from the lower transforming apparatus demand prediction unit S202, and acquires a demand pattern P4 of FIG. 8.

First, FIG. 7 illustrates one example of the electric demand of the lower transforming apparatus 106A, 106B, 106C. Specifically, FIG. 7 illustrates one example of the electric demand for one specific lower transforming apparatus 106A of three lower transforming apparatus 106A, 106B, 106C which are present in FIG. 1, as the output result from the lower transforming apparatus demand prediction unit S202. In this electric demand pattern P3, the tendency obviously appears that a demand is large at night and in early morning, and small in the daytime as a feature of the electric demand of the lower transforming apparatus 106A in a residential district.

FIG. 7 illustrates the electric demand before reflecting the electric demand adjustment amount requested from the load leveling process on the side of the upper transforming apparatus 109, and output results from the lower transforming apparatus demand prediction unit S202. Here, a maximum value of the electric demand of this specific lower transforming apparatus 106A of FIG. 7 is represented as PM.

As compared with FIG. 7, FIG. 8 illustrates the electric demand of the lower side after directly accepting and reflecting the electric demand adjustment amount determined by the side of the upper transforming apparatus 109 without performing any processing. Specifically, the maximum value PX of the electric demand of FIG. 3 corresponds to the maximum value PM of the electric demand of FIG. 8, and reflects the time shift amount of the electric demand. Here, with regard to the time shift amount of the electric demand, a load P24A of 2 to 4 o'clock zone is moved to a 10 to 12 o'clock zone, a load P46A of 4 to 6 o'clock zone is moved to a 18 to 20 o'clock zone, and a load P68A of 6 to 8 o'clock zone is moved to a 16 to 18 o'clock zone.

FIG. 8 illustrates results on which the electric demand adjustment amount of the lower transforming apparatus 106A calculated by the upper transforming apparatus adjustment amount distribution unit 207 is reflected through a process of the lower transforming apparatus adjustment amount reflection unit 209 of FIG. 2. As can be seen from the above sequence, an electric demand correction pattern P4 of FIG. 8 is acquired from the lower transforming apparatus adjustment amount reflection unit 209.

According to the electric demand correction pattern P4, the electric demand is reduced at the 2 to 4 time zone, the 4 to 6 time zone, and the 6 to 8 time zone, and on the other hand, the electric demand is increased at the 10 to 12 time zone, the 16 to 18 time zone, and the 18 to 20 time zone. Through the reflection of the electric demand adjustment amount using the above upper transforming apparatus adjustment amount distribution unit 207, the maximum value of the electric demand of the lower transforming apparatus 106A is reduced from PM to PN.

However, this reflection result is apparently insufficient. When a demand of each time zone after the time shift is viewed, the demand shift can be apparently accepted more. However, when the demand shift is simply accepted, the results as illustrated in FIG. 8 are obtained, and therefore most suitable reflection is sought in the present embodiment.

Figure 10:
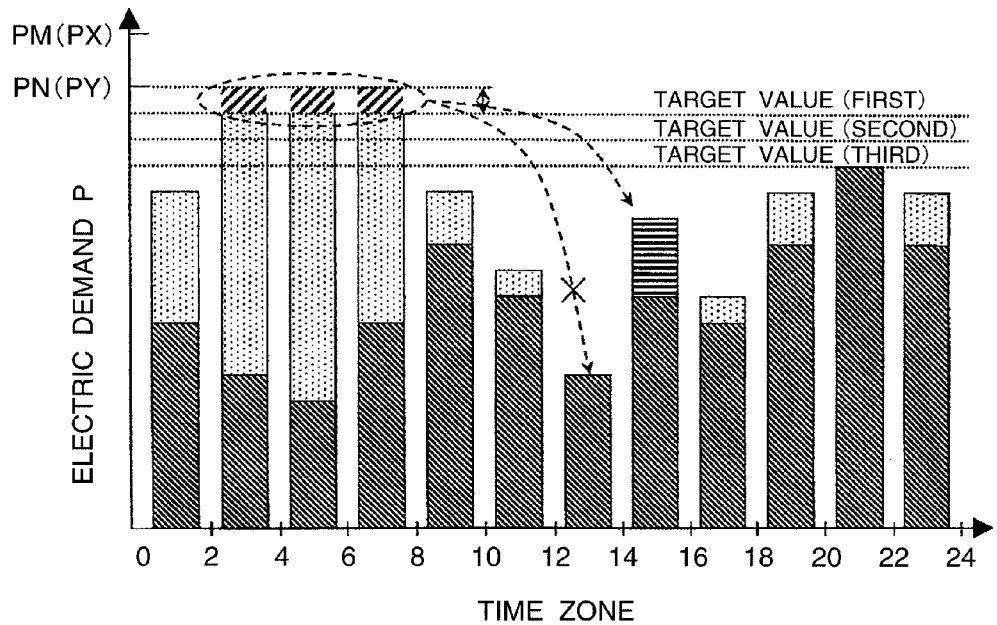
FIG. 10 is a schematic diagram for a setting method of a target value in load leveling of a lower transforming apparatus and a procedure in the load leveling.

For that purpose, in a lower transforming apparatus load leveling unit S210 of the present embodiment, the constrained condition of the upper transforming apparatus 109 is further reflected and a load of the lower transforming apparatus 106A is leveled. Namely, the pattern P4 of FIG. 8 is further leveled. In FIG. 10, a part of the display of the pattern P4 of FIG. 8 is changed and descriptions of the adjusted demands P24A, P46A, and P68A are changed.

Figure 9:
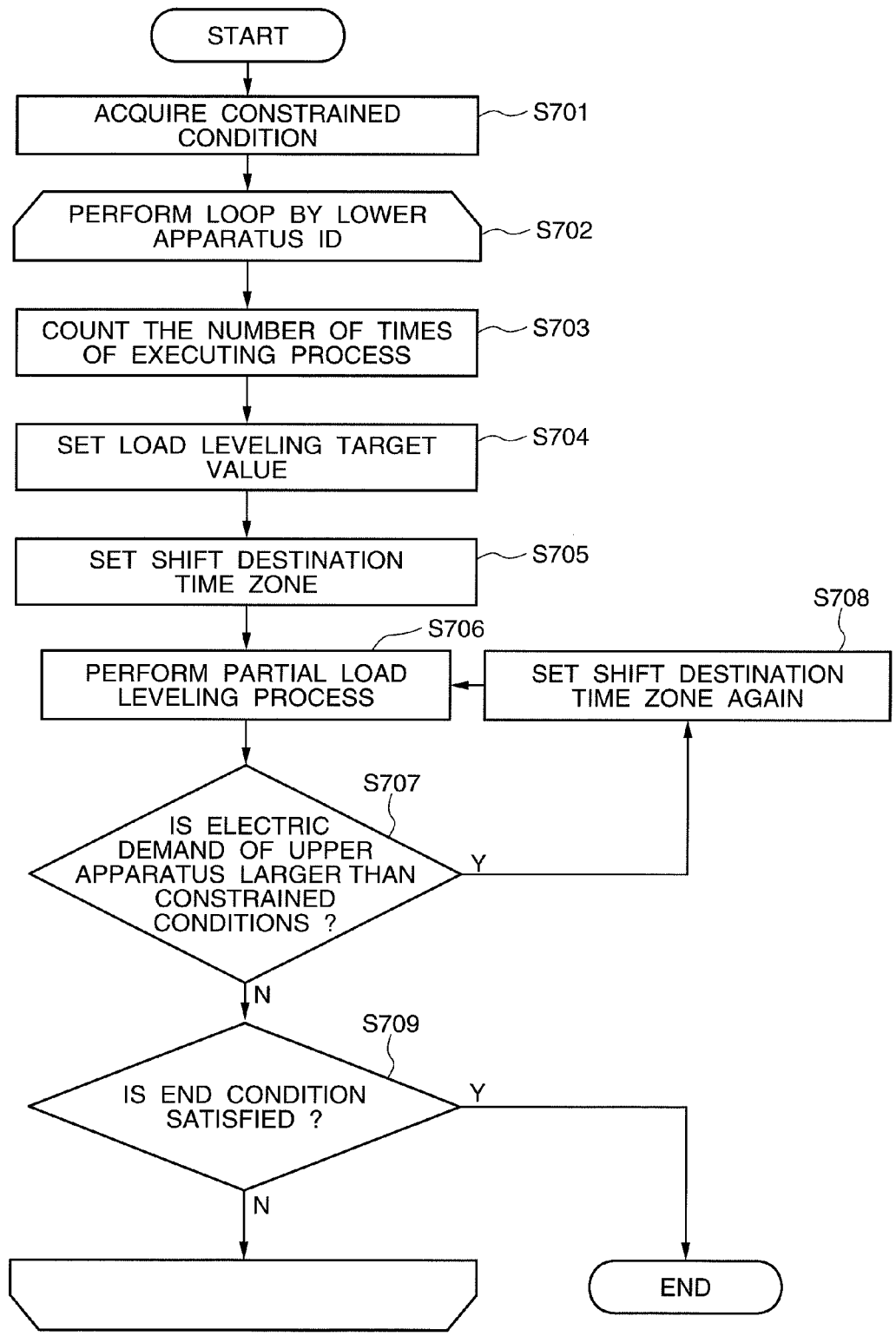
FIG. 9 is a flowchart illustrating a process content of a lower transforming apparatus load leveling unit S210.

In the process of the lower transforming apparatus load leveling unit S210, the time shift of a portion surrounded by a dotted line is further performed based on the pattern P4 of FIG. 8. In FIG. 9, a flowchart for that purpose is illustrated.

In FIG. 9, the constrained condition is first acquired at step S701. In accordance with the past examples, the constrained condition is the target value PY being the maximum value after the load leveling of the upper transforming apparatus 109 as illustrated in FIG. 4. The target value PY of the load leveling is set as the maximum value of the time non-shiftable electric demand.

Next, the loop is performed by using the ID of the lower transforming apparatus 106A, 106B, 106C at step S702. Specifically, the ID "0001", the ID "0002", and the ID "0003" are processed in sequence, and the ID "0001" is processed again in the order of priorities after performing the process in a general way.

At step S703, the number of times of executing the process is sequentially counted from zero for each ID of the lower transforming apparatus 106A, 106B, 106C.

At step S704, the target value of the load leveling in the lower transforming apparatus 106A is set. A method for setting the target value of the load leveling in the lower transforming apparatus 106A will be described with reference to FIG. 10. FIG. 10 is a schematic diagram for a setting method of the target value of the load leveling in the lower transforming apparatus 106A and a procedure of the load leveling in the upper and lower transforming apparatus.

Figure 11:
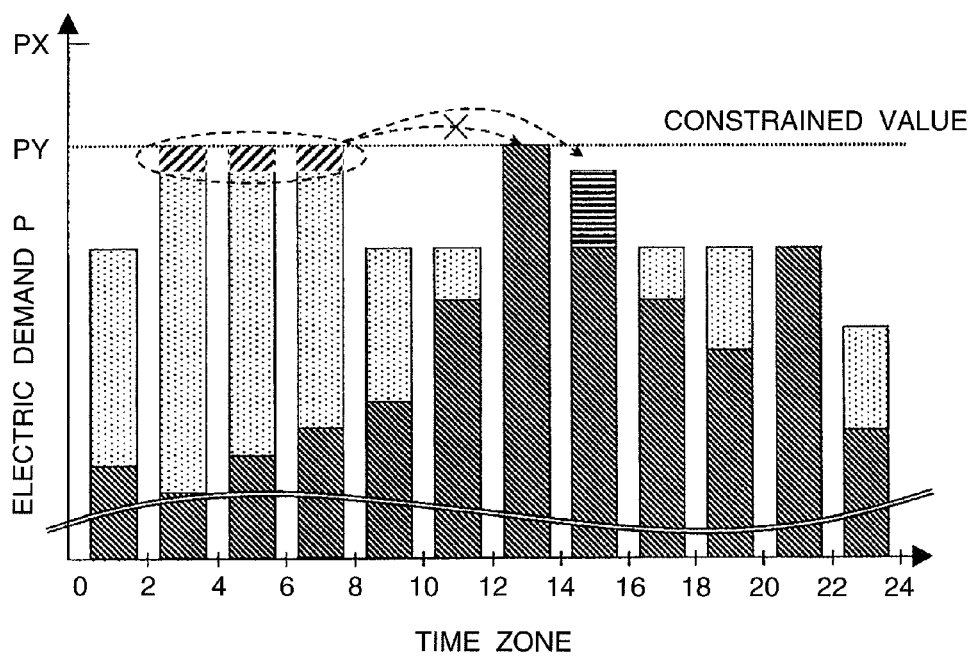
FIG. 11 illustrates time shift conditions of an electric demand in an upper transforming apparatus.

Here, in FIG. 10, time shift conditions of the electric demand of the lower transforming apparatus 106A are illustrated, and in FIG. 11, time shift conditions of the electric demand of the upper transforming apparatus 109 at this time are illustrated. An initial value of the target value of the load leveling in the lower transforming apparatus 106A is set, for example, as in a formula (2).

Target value of load leveling=maximum value of electric demand×(1−10%*the number of times of processing)                                     formula (2)

When this idea will be described with reference to FIG. 10, the maximum value of the present electric demand is PN being a value of 2 to 8 o'clock, and further 10% of the PN is sequentially time-shifted. In FIG. 10, the first, second, and third target values are displayed by dotted lines.

At step S705, a shift destination time zone is set. In the electric demand (FIG. 10) of the lower transforming apparatus 106A, the shift destination time zone is set as a time zone in which the electric demand is minimized. Namely, the 12 to 14 time zone is selected.

At step S706, partial load leveling process, namely, minor load leveling process (10% of the time shift) is tried. Specifically, an electric demand portion larger than a new target value of the formula (2) is tried to be shifted to the 12 to 14 time zone.

At step S707, whether the electric demand of the upper transforming apparatus 109 is larger than the constrained value PY is determined. Through this determination, if the electric demand of the lower transforming apparatus 106A is shifted to the 12 to 14 time zone, since the electric demand of the upper transforming apparatus 109 is larger than the constrained value PY, the process proceeds to "Yes" of the flowchart.

At step S708, the shift destination time zone is set again. Specifically, a small time zone is then selected for the electric demand of the lower transforming apparatus 106A. A time zone having a second smallest electric demand with respect to the 12 to 14 time zone is from 14 to 16 o'clock. For that purpose, the partial load leveling process step S706 is tried again. As a result, at step S707, since the electric demand of the upper transforming apparatus is not larger than the constrained value, the process proceeds to "No" of the flowchart.

At step S709, whether an end condition is satisfied is determined. The end condition is any of the following conditions (OR conditions).

1. All electric demands to be shifted of all the lower transforming apparatus 106A, 106B, 106C are shifted to other time zones.

2. A time zone in a shift destination of the electric demand to be shifted of the lower transforming apparatus in which a value of the electric demand of the upper transforming apparatus is smaller than or equal to the constrained value is not present.

Figure 12:
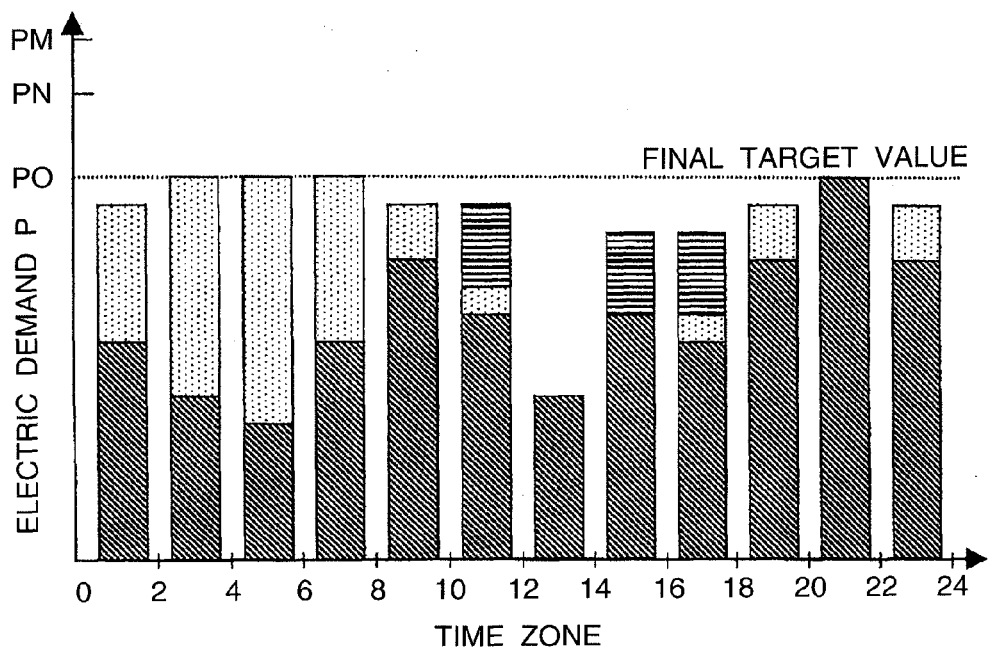
FIG. 12 illustrates an electric demand of a lower transforming apparatus after a final adjustment.
Figure 13:
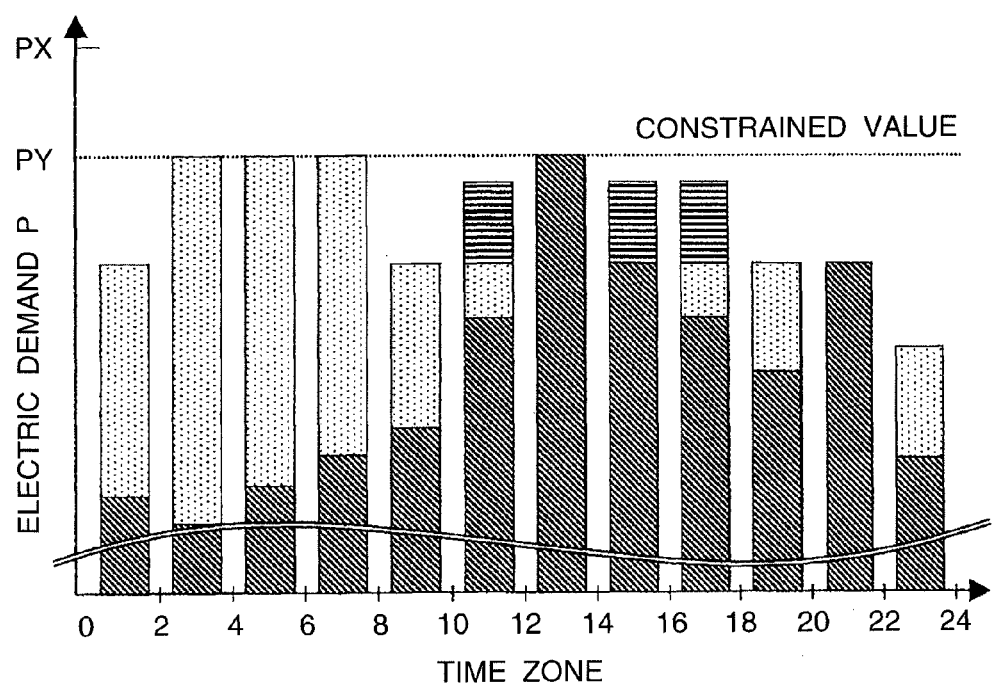
FIG. 13 illustrates an electric demand of an upper transforming apparatus after a final adjustment.

If the end condition is satisfied, the process proceeds to "Yes" of the flowchart and ends. On the other hand, if the end condition is not satisfied, the process proceeds to "No" of the flowchart and repeats processing again in the next lower transforming apparatus ID. Through the above-described process, a pattern of the electric demand illustrated in FIGS. 12 and 13 is finally obtained. FIG. 12 illustrates the electric demand of the lower transforming apparatus, and FIG. 13 illustrates the electric demand of the upper transforming apparatus. The maximum value of the electric demand of the lower transforming apparatus 106A is reduced from PM of an initial state to PO, and the maximum value of the electric demand of the upper transforming apparatus 109 is reduced from PX of an initial state to PY.

Figure 14:
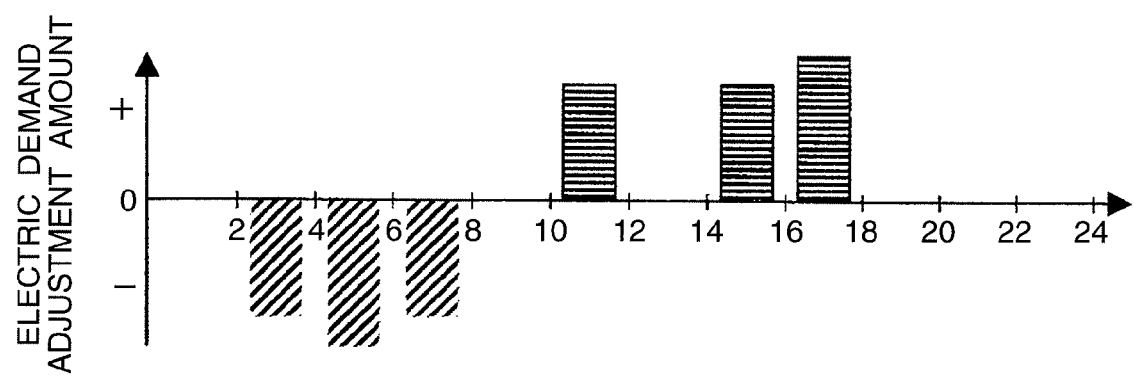
FIG. 14 illustrates an electric demand adjustment amount of a lower transforming apparatus of a certain lower transforming apparatus ID.

Referring to FIG. 2, the lower transforming apparatus adjustment amount distribution unit S211 distributes the electric demand adjustment amount of the lower transforming apparatus 106A to each customer. FIG. 14 illustrates the electric demand adjustment amount of the lower transforming apparatus of a certain lower transforming apparatus ID. A value is a difference between output results (FIG. 7) from the lower transforming apparatus demand prediction unit S202 as an initial condition and the electric demand (FIG. 12) after the load leveling of the lower transforming apparatus 106A. Note that a positive area of the electric demand adjustment amount means an increase in the electric demand, and a negative area of the electric demand adjustment amount means a decrease in the electric demand.

The lower transforming apparatus adjustment amount distribution unit S211 distributes the electric demand adjustment amount for each time zone illustrated in FIG. 14 to each customer. A method is to refer to the electric demand adjustment ability DB S215, add the adjustment ability to each customer, and distribute the electric demand adjustment amount with a rate of its size with regard to records filtered by the noticed lower transforming apparatus ID.

Suppose that the electric demand adjustment amount of a certain time zone is 10 and the electric demand adjustment ability of the customers is 5, 3, and 2 in the case of the IDs "0001", "0002", and "0003", respectively. A rate of the electric demand adjustment ability to each customer is as follows:

the electric demand adjustment amount of the customer ID "0001":

$$10 \times \{5/(5+3+2)\},$$

the electric demand adjustment amount of the customer ID "0002":

$$10 \times \{3/(5+3+2)\}, \text{ and}$$

the electric demand adjustment amount of the customer ID "0003":

$$10 \times \{2/(5+3+2)\}.$$

The above-described processes of S209 to S211 correspond to the load leveling process S2000 on the side of the lower transforming apparatus 106A, 106B, 106C, and are those corresponding to the second load leveling processing unit of the second embodiment.

As described above, in the second embodiment, there functions "a second load leveling processing unit (S2000) which corrects the electric demand of the lower transforming apparatus 106A, 106B, 106C from the electric demand prediction unit (S100) by the electric demand distributed by the first load leveling processing unit (S1000), sets a new target while reducing the corrected maximum electric demand by a predetermined amount, and repeats (S211) correction while confirming that the electric demand of the upper transforming apparatus of the time zone at the time of shifting a reduced demand to a minimum demand time zone is not larger than the electric demand target".

Finally, in the second embodiment, there functions the output unit which distributes the electric demand in each time zone determined by the second load leveling processing unit to each device within the customer and controls a use time zone of the devices within the customer through the communication unit.

In FIG. 2, a communication device S214 transmits the electric demand adjustment amount information to the communication device 104 of the customer 101 or the storage battery 107, thereby attaining this function. Specifically, in the case of transmitting information to the communication device 104 of the customer 101, the communication device S214 calculates the electric demand adjustment amount for each customer ID. On the other hand, in the case of transmitting information to the storage battery 107, the communication device S214 transmits a value of the electric demand adjustment amount itself in each time zone illustrated in FIG. 14.

Referring to FIG. 2, a load adjustment effect determination unit S212 calculates a peak-cut effect due to the load leveling. Here, the peak-cut effect is calculated by using formulae (3) and (4).

$$\text{Peak-cut effect of upper transforming apparatus} = (PX-PY)/PX \quad \text{formula (3)}$$

$$\text{Peak-cut effect of lower transforming apparatus} = (PM-PO)/PM \quad \text{formula (4)}$$

Note that PX, PY, PM, and PO have the same meanings as those of heretofore treated variables.

The output unit S213 notifies a management unit of the system of the peak-cut effect or the effect in the case where a value of the peak-cut effect is smaller than a predetermined threshold.

As described above, the load leveling system of the power system according to the second embodiment functions and attains an initial effect.

In the description of the second embodiment, "when the electric demand target is set according to the maximum value of non-adjustable demand", it is included as the second embodiment. Further, "when the minimum demand time zone for shifting a reduced demand in the second load leveling processing unit is set as a time zone except the time zone determined as the electric demand target in the first load leveling processing unit", it is included as the second embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A load leveling system of a power system comprising:
a lower transforming apparatus;
an upper transforming apparatus;
a high-voltage line;
a low-voltage line;
a communication unit;
a load leveling device;
an electric demand prediction unit configured to divide a future electric demand into an adjustable demand and a non-adjustable demand and calculate the adjustable and non-adjustable demands in each time zone at least in the lower transforming apparatus and the upper transforming apparatus;
a first load leveling processing unit configured to set an electric demand target within a maximum electric demand, shift a demand larger than the electric demand target to other time zones, and distribute the demand larger than the electric demand target to the lower transforming apparatus for at least one customer in accordance with an electric demand of the upper transforming apparatus from the electric demand prediction unit;

a second load leveling processing unit configured to correct an electric demand of the lower transforming apparatus from the electric demand prediction unit with the electric demand distributed by the first load leveling processing unit, reduce a maximum electric demand after correction by a predetermined amount to set a new target, and repeat a correction while confirming that the electric demand of the upper transforming apparatus in the time zone at a time of shifting the reduced demand to a minimum demand time zone is not larger than the electric demand target; and an output unit configured to distribute an electric demand in each time zone determined by the second load leveling processing unit to each device within at least one other customer and control a use time zone of the devices within the at least one other customer through a communication unit;

wherein a major customer of the power system and the lower transforming apparatus are connected to the upper transforming apparatus via the high-voltage line, and the at least one other customer of the power system is connected to the lower transforming apparatus via the low-voltage line;

wherein the communication unit is arranged for communication between the major customer and the at least one other customer; and wherein the load leveling device operates to predict, for each of said time zones, at least electric demands of the upper transforming apparatus and the lower transforming apparatus based on past data for electric demand of a day of conditions nearest to those of a prediction day and further added specific conditions, and output change request information of an operation time of devices within the at least one other customer, according to the prediction made by the load leveling device, so as to reduce a maximum value of electric demands of both the upper transforming apparatus and the lower transforming apparatus for each of the upper and lower transforming apparatuses respectively corresponding to either one of said adjustable demand or said non-adjustable demand.

2. The load leveling system of a power system according to claim 1, wherein the electric demand target is set to a maximum value of a non-adjustable demand.

3. The load leveling system of a power system according to claim 1, wherein a minimum demand time zone for shifting a reduced demand in the second load leveling processing unit is set as a time zone other than the time zone set as an electric demand target in the first load leveling processing unit.

4. The load leveling system of a power system according to claim 2, wherein a minimum demand time zone for shifting a reduced demand in the second load leveling processing unit is set as a time zone other than the time zone set as an electric demand target in the first load leveling processing unit.

\* \* \* \* \*